(12) United States Patent
Robles (10) Patent No.: US 11,174,149 B2
(45) Date of Patent: Nov. 16, 2021

(54) MULTIPURPOSE CLEANING SADDLE RACK

(71) Applicant: Olivia Isabel Robles, Alpharetta, GA (US)

(72) Inventor: Olivia Isabel Robles, Alpharetta, GA (US)

(*) Notice: Subject to any disclaimer, the term of this patent is extended or adjusted under 35 U.S.C. 154(b) by 16 days.

(21) Appl. No.: 16/436,908

(22) Filed: Jun. 10, 2019

(65) Prior Publication Data

US 2020/0385259 A1    Dec. 10, 2020

(51) Int. Cl.
*B68C 1/00* (2006.01)
*F16M 13/02* (2006.01)

(52) U.S. Cl.
CPC .......... *B68C 1/002* (2013.01); *F16M 13/022* (2013.01)

(58) Field of Classification Search
CPC .......... B68C 1/002; B68C 1/00; F16M 13/022
USPC .......... 211/85.11, 78, 95, 164, 171
See application file for complete search history.

(56) References Cited

U.S. PATENT DOCUMENTS

| | | | |
|---|---|---|---|
| 2,403,324 A | 7/1946 | Anderson | |
| 2,952,366 A * | 9/1960 | Botten | B68C 1/002 211/104 |
| 3,147,606 A | 9/1964 | Holmberg | |
| 3,305,101 A * | 2/1967 | Mills | B68C 1/002 211/106.01 |
| 3,780,971 A * | 12/1973 | De Filipps | B68C 1/002 248/309.1 |
| 4,541,535 A | 9/1985 | Bartholomew | |
| 4,712,693 A * | 12/1987 | Striplin | F16M 11/10 211/164 |
| 5,058,841 A | 10/1991 | Fernbaugh et al. | |
| 5,101,985 A * | 4/1992 | Pasban-Dowlatshahi | B68C 1/002 211/85.11 |
| 5,590,795 A * | 1/1997 | Wright | A47B 81/00 211/104 |
| 6,808,077 B2 * | 10/2004 | McConnell | A47F 5/03 211/164 |
| 6,955,270 B2 * | 10/2005 | Lay | A47B 46/00 211/85.11 |
| 7,669,809 B1 * | 3/2010 | Toner | B68C 1/002 248/130 |
| 8,616,383 B1 * | 12/2013 | Miller | B68C 1/002 211/85.11 |
| 9,493,336 B2 * | 11/2016 | Scanlon | F16B 2/08 |

(Continued)

*Primary Examiner* — Patrick D Hawn
(74) *Attorney, Agent, or Firm* — Sagacity Legal, PLLC (57) ABSTRACT

A method and saddle rack to hold a saddle is disclosed. In one embodiment the saddle rack employs a pin that can be put through apertures on one end of a connecting rod and base mounted on a vertical retaining wall, or in an alternative embodiment employs a connecting rod that integrally attaches at one end to a front side of a block with hooks on a top and bottom side that attach to a rigid loop on the wall. Supporting wings attach to the other end of the connecting rod and extend upward to support the saddle upside down and to allow for daily storage and cleaning of the underside of the saddle. In one embodiment the pin would be removed, the connecting rod rotated 180 degrees, and the pin would be reinserted to hold the saddle bottom side down for topside cleaning. In the other embodiment one of the hooks would attach the rack to the rigid loop in either of the two cleaning positions or attach to the ridge loop to form a collapsed position.

14 Claims, 10 Drawing Sheets

(56) References Cited

U.S. PATENT DOCUMENTS

| | | | | |
|---|---|---|---|---|
| 10,464,806 | B1* | 11/2019 | Shackleford | B68B 9/00 |
| 2011/0114584 | A1* | 5/2011 | Shirey | B68C 1/002 |
| | | | | 211/85.11 |
| 2014/0338292 | A1* | 11/2014 | Abel | B68C 1/002 |
| | | | | 54/44.1 |
| 2014/0339184 | A1* | 11/2014 | Couch | B68B 9/00 |
| | | | | 211/85.11 |
| 2016/0167943 | A1* | 6/2016 | Scanlon | B68C 1/002 |
| | | | | 248/226.11 |
| 2017/0341924 | A1* | 11/2017 | DeWitt | A47B 81/00 |

* cited by examiner

MULTIPURPOSE CLEANING SADDLE RACK

TECHNICAL FIELD

The claimed embodiment pertains generally to racks for holding saddles and more specifically to lightweight hanging saddle racks.

BACKGROUND OF THE INVENTION

A portable multipurpose saddle rack and method is disclosed.

Existing saddle racks are typically either stationary and cumbersome, or do not include a mechanism to allow for saddle to be supported while the underside of the saddle can be cleaned. Bartholomew (U.S. Pat. No. 4,541,535) presents a fairly simple saddle rack with winged supports. Mills (U.S. Pat. No. 3,305,101) illustrates a hanging rack that is portable. Fernbaugh (U.S. Pat. No. 5,058,841) adapts a simple collapsible hanging rack to also have a free-standing embodiment. Larger, free-standing models, like those of Holmberg (U.S. Pat. No. 3,147,606) and Anderson (U.S. Pat. No. 2,403,324), include mechanisms for rotation or general adaptation to be support the saddle so that the underside of the saddle can be cleaned. These racks, however, are impractical for competition use and do not travel easily. Further these racks do not provide portability for equestrians to enable the equestrians to quickly, and easily clean the underside of the saddle.

SUMMARY OF THE INVENTION

In one embodiment, a saddle rack is provided that includes a mounting attachment assembly configured to engage with a vertically oriented structure, and a saddle supporting assembly that engages with the mounting attachment assembly. The saddle supporting assembly includes a plurality of supporting wings, each of the plurality of supporting wings having a first end and a second end with an axis extending from the respective first end to the respective second end. The saddle supporting assembly is configured to engage with the mounting attachment assembly. The saddle supporting assembly is configured to be a) supported by the mounting attachment assembly with the axis extending horizontally in a first orientation, and b) rotated 180 degrees around the axis to be supported by the mounting attachment assembly with the axis extending horizontally in a second orientation. Each of the plurality of supporting wings in the first orientation extend upward and outward from the respective first end and extend upward and outward from the respective second end. Each of the supporting wings in the second orientation extend downward and outward from the respective first end and extend downward and outward from the respective second end.

In another embodiment, a saddle rack is provided that includes a mounting attachment assembly, having a portable base mount with a hooking first end to enable the mounting attachment assembly to hang on the vertically oriented structure and a stabilizing second end to prevent an unhooking of the portable base mount from the vertically oriented structure. The mounting attachment assembly has a saddle supporting assembly receiver to engage with a connecting rod of a saddle supporting assembly. The connecting rod forms an aperture adjacent to a connecting end of the connecting rod through which a securing pin is configured to be inserted. The saddle supporting assembly receiver forms a first aperture to receive the connecting rod and forms a second aperture that aligns with the aperture of the connecting rod to receive the securing pin into the aperture of the connecting rod upon the first aperture receiving the connecting rod. The saddle supporting assembly includes the connecting rod connected to a plurality of supporting wings, each of the plurality of supporting wings having a first end and a second end with an axis extending from the respective second end to the respective first end through the connecting rod. The saddle supporting assembly is configured to engage with the mounting attachment assembly wherein the connecting rod upon insertion into first aperture a) is configured to be supported by the mounting attachment assembly in a first orientation with the axis extending horizontally, and b) configured to be rotated 180 degrees around the axis and inserted into the first aperture to be supported by the mounting attachment assembly in a second orientation with the axis extending horizontally. Each of the plurality of supporting wings in the first orientation extends upward and outward from the respective first end and extend upward and outward from the respective second end to support a saddle in an upward orientation so that an underside of the saddle can be cleaned from above and stored. Each of the plurality of supporting wings in the second orientation extend downward and outward from the respective first end and extend downward and outward from the respective second end to support the saddle in an downward orientation so that the topside of the saddle can be cleaned from above.

In a further embodiment, a method for cleaning and storing a saddle is disclosed. The method includes hanging with a hooking first end of a portable base mount of a mounting attachment assembly on a vertically oriented structure and preventing an unhooking of the portable base mount from the vertically oriented structure with a stabilizing second end of the portable base mount. A saddle supporting assembly receiver of the mounting attachment assembly is engaged with a connecting rod of a saddle supporting assembly. The connecting rod is inserted into a first aperture of the saddle supporting assembly receiver. A second aperture of the saddle supporting assembly receiver is aligned with the aperture of the connecting rod. A securing pin is inserted into the aperture of the connecting rod upon the first aperture receiving the connecting rod. The second aperture of the saddle supporting assembly receiver is aligned with the aperture of the connecting rod. The saddle supporting assembly includes the connecting rod connected to a plurality of supporting wings both having a first end and a second end with an axis extending from the respective second end to the respective first end through the connecting rod. Upon the mounting attachment assembly hanging on the vertically oriented structure, the saddle supporting assembly receiver engages with the connecting rod extending through the first aperture such that the saddle supporting assembly and the connecting rod upon insertion into first aperture is supported by the saddle supporting assembly receiver in a first orientation with the axis extending horizontally. The saddle supporting assembly and connecting rod are rotated 180 degrees around the axis so that the saddle supporting assembly is supported by the mounting attachment assembly in a second orientation with the axis and connecting rod extending horizontally. Upon the saddle supporting assembly oriented to the first orientation, each of the plurality of supporting wings are oriented to extend upward and outward from the respective first end and to extend upward and outward from the respective second end. A saddle is supported in an upward orientation upon orienting the plurality of supporting wings in the first orientation so that the underside of the saddle is configured to be cleaned from above and stored. Upon the saddle supporting assembly oriented to the second orientation, the plurality of supporting wings are oriented in the second orientation to extend downward and outward from the respective first end and to extend downward and outward from the respective second end. The saddle is supported in a downward orientation upon orienting the plurality of supporting wings in the second orientation so that the top side of the saddle is configured to be cleaned from above.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
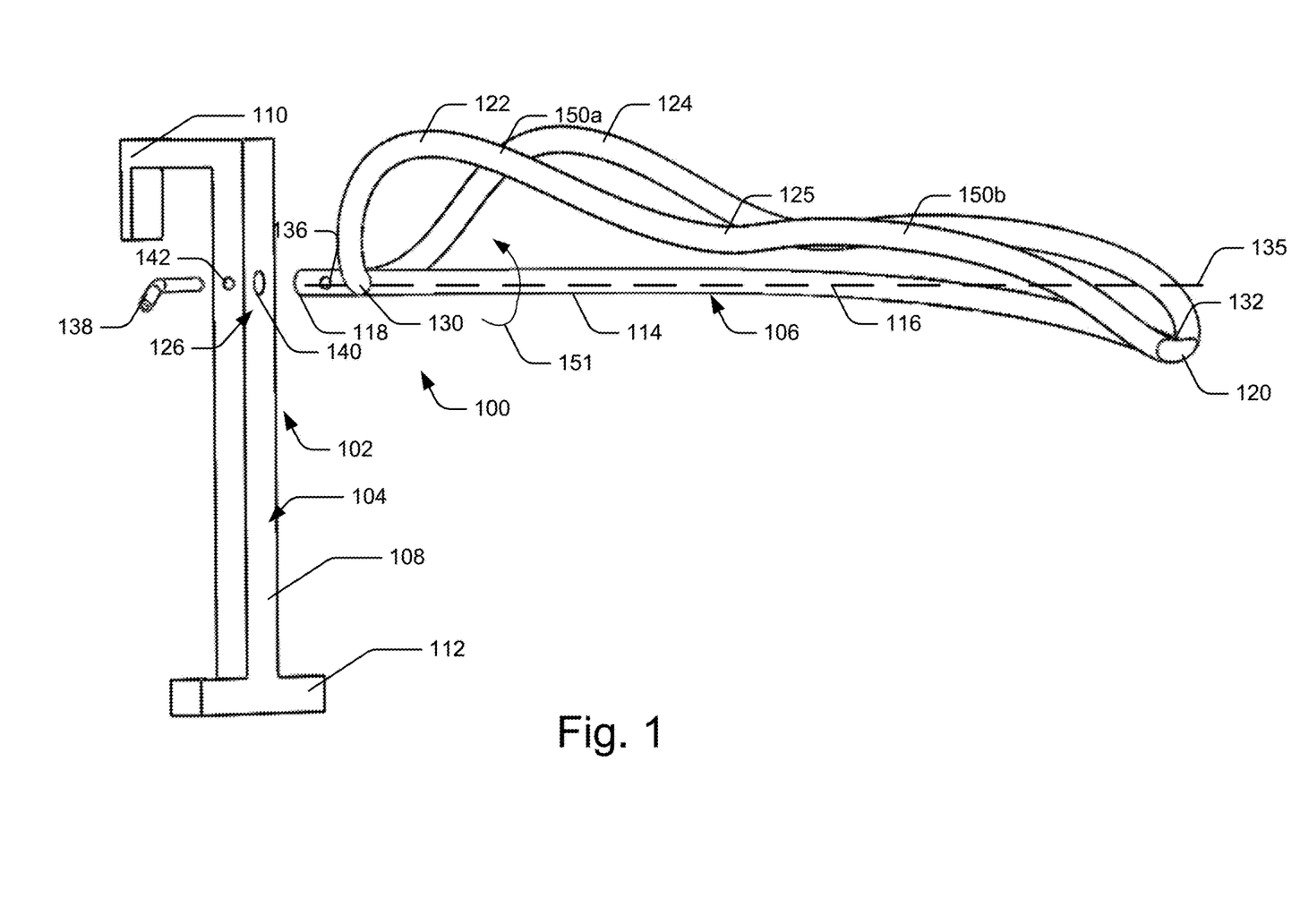
FIG. 1 is a side perspective view illustrating a portable saddle rack in a first orientation.
Figure 2A:
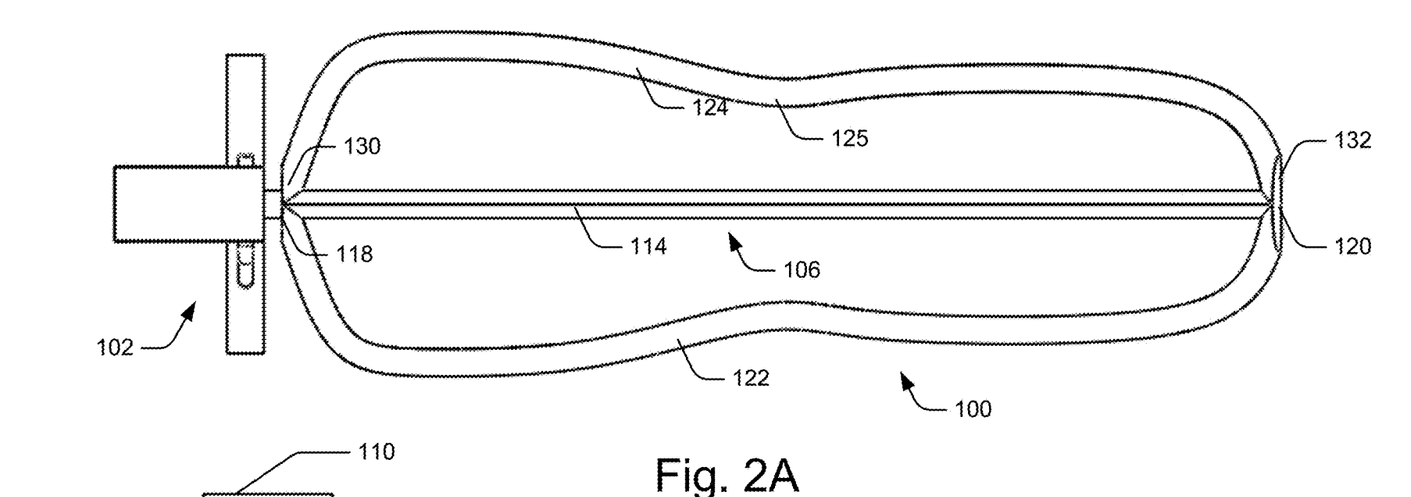
FIGS. 2A-2B shows a top perspective view and a side perspective view respectively of the portable saddle rack.
Figure 2B:
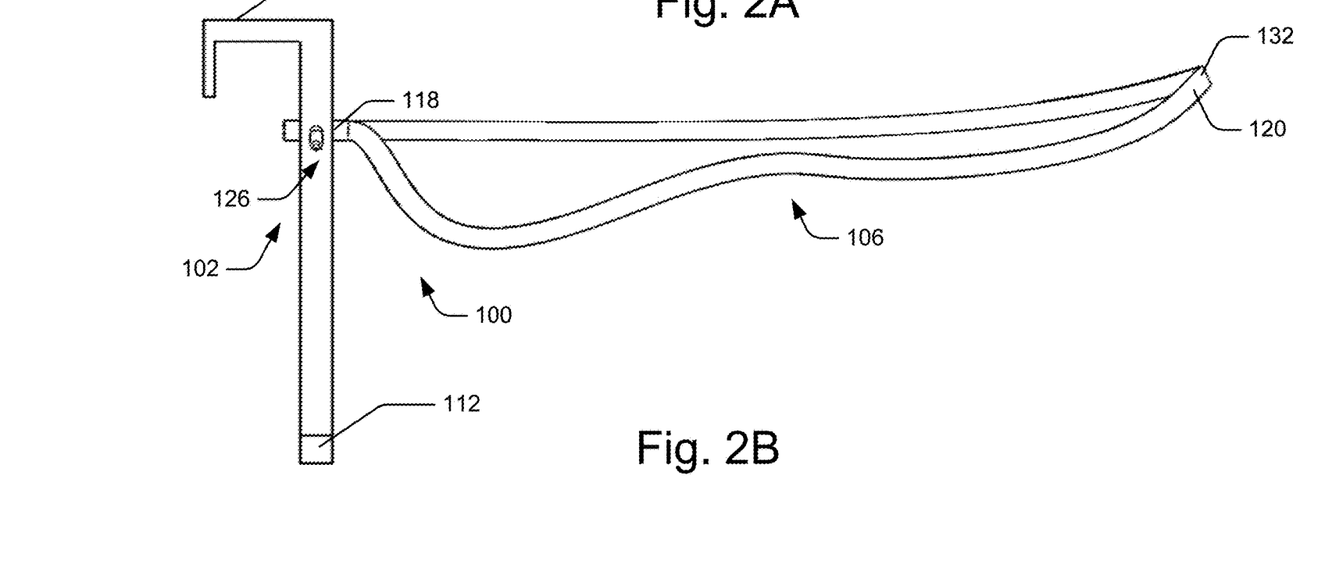
Figure 3A:
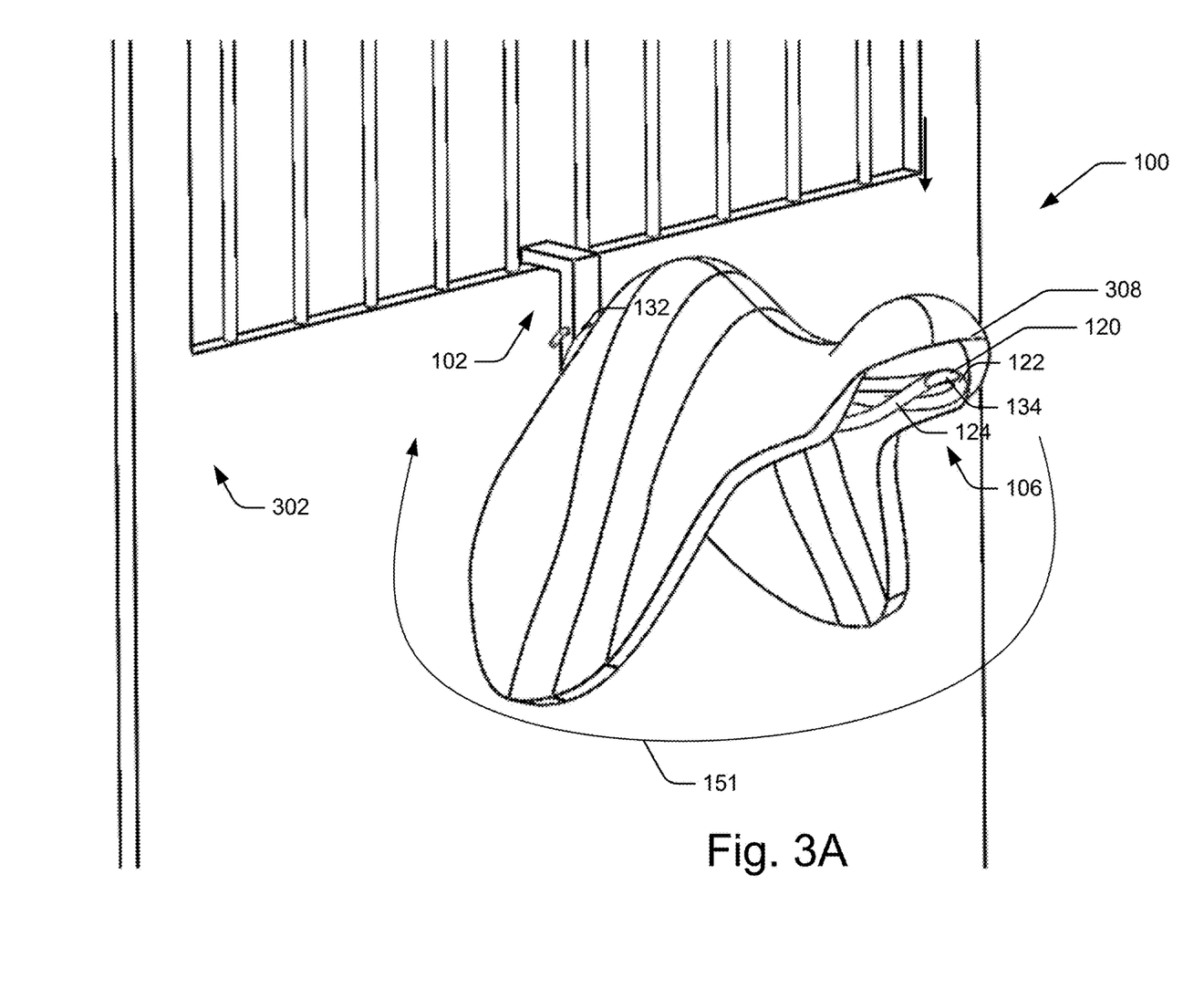
FIGS. 3A-3B shows a front perspective view of the portable saddle rack shown in FIG. 1 in a second orientation and in a first orientation respectively while attached to a vertical structure.
Figure 3B:
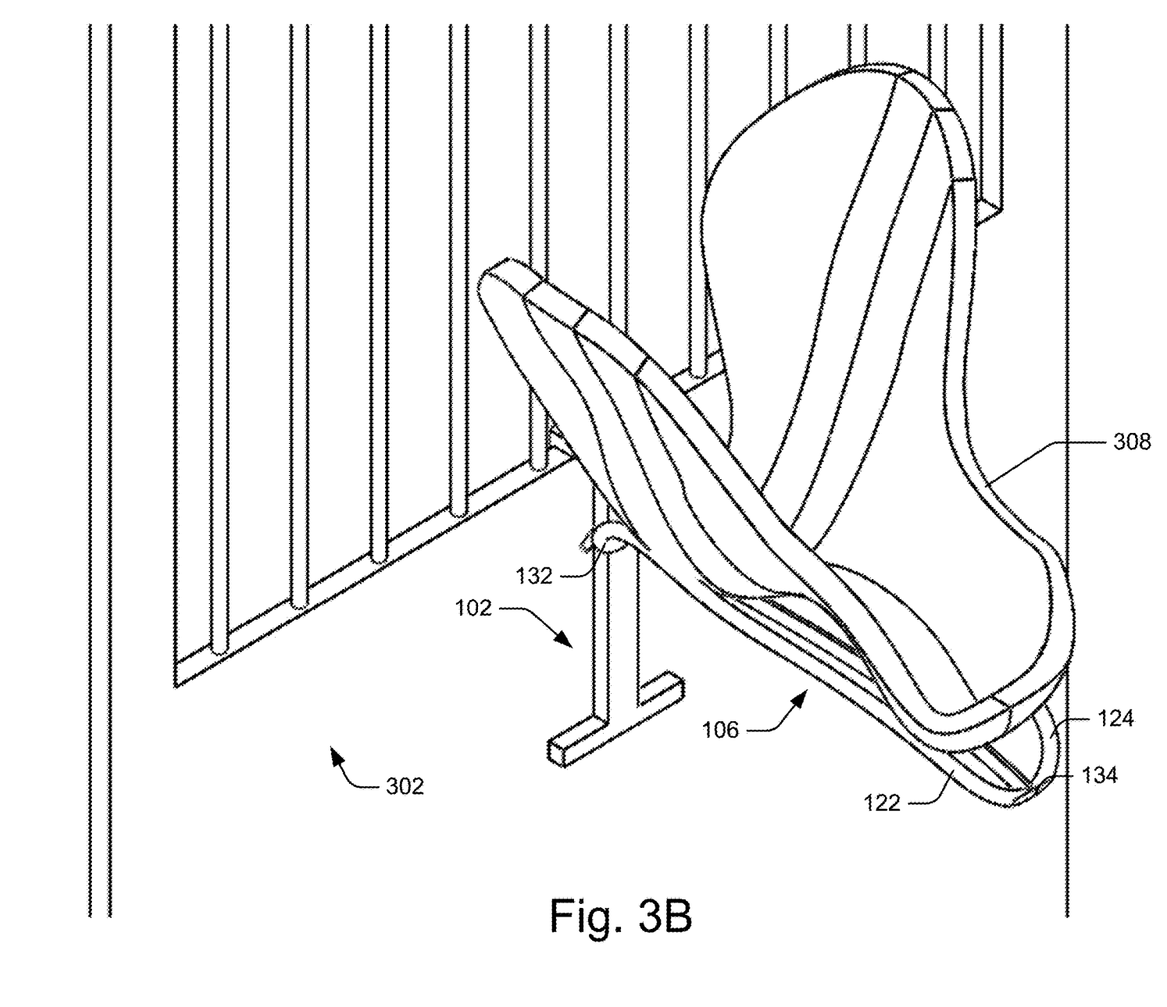

Referring to FIGS. 1, 2B, and 3B, there is shown a portable embodiment of a saddle rack 100, in a first orientation that is configured for general saddle 308 storage and bottom side cleaning. Referring to FIGS. 2A, and 3A, there is shown the portable embodiment of a saddle rack 100, in a second orientation that is configured for general saddle 308 storage and top side cleaning.

Referring to FIGS. 1, 2A-B, and 3A-B, the saddle rack 100 includes a mounting attachment assembly 102 and a saddle supporting assembly 106. Mounting attachment assembly 102 includes a wall engagement assembly 104 that engages with a vertically oriented structure 302 (See FIGS. 3A and 3B) and saddle supporting assembly 106 that holds a saddle 308 (FIGS. 3A and 3B).

The mounting attachment assembly 102 includes a portable base mount 108 with a hooking first end 110 to enable the mounting attachment assembly 102 to hang on the vertically oriented structure 302. The wall engagement assembly 104 also includes a stabilizing second end 112 to prevent unhooking of the portable base mount 108 from the vertically oriented structure 302.

The saddle supporting assembly 106 includes a connecting rod 114 extending along an axis 116 with a connecting end 118 and an adjoining end 120. The assembly also includes a left supporting wing 122 and right supporting wing 124 (also referred to herein as a "saddle engaging portion") connected to the connecting rod 114. The tubular shaped connecting rod 114 is coupled at the connecting end 118 with a supporting assembly receiver 126 portion of base mount 108. Supporting wings 122 and 124 each have a first end 130 and a second end 132 with the axis 116 extending along the connecting rod 114 from the first end 130 to a point 135 adjacent the second end 132. Supporting wings 122-124 may be tubular shaped rods that extend between first end 130 and 132 as described herein. Referring to FIGS. 1 and 2A, wings 122 and 124 curve upward and outward from first end 130, then curve downward and inward to a plateau point 125. Then wings 122 and 124 curve upward and outward, and then downward and inward to second end 132.

The connecting rod 114 is coupled adjacent its connecting end 118 with first ends 130 of the left and right supporting wings 122-124. The connecting rod 114 is coupled with the second ends 134 of the supporting wings 122-124 adjacent the adjoining end 120.

Referring to FIGS. 1, 2B, and 3B, the saddle supporting assembly 106, when the wall engagement assembly 104 engages with the vertically oriented wall 302, engages with the saddle engaging portion 122-124 such that the mounting attachment assembly 102 can support the saddle engaging portions 122-124 of saddle supporting assembly 106 with the axis 116 extending horizontally in a first orientation. The saddle supporting assembly 106, when the wall engagement assembly 104 engages with the vertically oriented wall 302, it can be rotated 180 degrees around the axis 116 to support the saddle engaging portion 122-124 of saddle supporting assembly 106 in a second orientation (See FIGS. 2A and 3A). The wall engagement assembly 104 includes the saddle supporting assembly receiver 126 that engages with the saddle supporting assembly 106 to support the saddle supporting assembly 106 upon be rotated 180 degrees around the axis 116 from the first orientation to the second orientation.

In one implementation the connecting rod 114 forms an aperture 136 adjacent the connecting end 118 through which a securing pin 138 can be inserted. The saddle supporting assembly receiver 126 forms a first aperture 140 on a side of the receiver 126 opposing the vertical wall 302 to receive the connecting rod 114. Supporting assembly receiver 126 forms a second aperture 142 on adjacent sides to receive the securing pin 138 when the first aperture 140 receives the connecting rod 114.

The supporting wings 122-124 in the first orientation extend downward and outward from the first end 132 and extend downward and outward from the second end 134. When mounting assembly 102 hangs on vertical wall 302, the elevation of the second end 134 is below the first end 132.

Referring to FIGS. 2A and 3A, the supporting wings 122-124 in the second orientation extend downward and outward from the first end 130 and extend downward and outward from the second end 132. When mounting assembly 102 hangs on vertical wall 302, the elevation of the second end 132 is above the first end 130. Supporting wings 122-124 are constructed such that a diverging angle between the supporting wings 122-124 is greater at the adjoining end 120 of said connecting rod 114 than at the connecting end 118 of the connecting rod 114.

Referring to FIG. 1, in one embodiment each of supporting wings 122-124 have at least two curves 150a and 150b to form a shape of an English saddle 308 (FIG. 3B) such that when the saddle supporting assembly 106 is in the first orientation, the supporting wings 122-124 extend to a point further downward adjacent the adjoining end 120 of the connecting rod 114 and extend to a point less downward adjacent the connecting end 118 of the connecting rod.

Saddle rack 100 may be used to clean and store a saddle 302 by hanging with the hooking first end 110 of the portable base mount 108 of the mounting attachment assembly 102 on the vertically oriented structure 302. The unhooking of the portable base mount 108 from the vertically oriented structure 302 may be prevented with a stabilizing second end 112 of the portable base mount 108.

The saddle supporting assembly receiver 126 of the mounting attachment assembly 102 engages with a connecting rod 114 of the saddle supporting assembly 106 by inserting the connecting rod 114 into a first aperture 140 of the saddle supporting assembly receiver 126, aligning the second aperture 142 of the saddle supporting assembly receiver 126 with the aperture of the connecting rod 114, and inserting the securing pin 138 into the aperture 136 of the connecting rod 114 and second aperture 142 upon the first aperture 140 receiving the connecting rod 114 and the second aperture 142 of the saddle supporting assembly receiver aligning with the aperture 136 of the connecting rod.

The saddle supporting assembly 106 includes the connecting rod 114 connected to both supporting wings 122-124. Upon the mounting attachment assembly 102 hanging on the vertically oriented structure 302, the saddle supporting assembly receiver 126 is engaged with the connecting rod 114 extending through the first aperture 140 such that the saddle supporting assembly 106 and the connecting rod 114 upon insertion into first aperture 140 is supported by the saddle supporting assembly receiver 126 in the first orientation with the axis 116 extending horizontally (slightly elevated at the connecting end 118 with respect to adjoining end 120).

Referring to FIGS. 1 and 3B, upon the saddle supporting assembly 106 being oriented to the first orientation, the supporting wings 122-124 are oriented to extend upward and outward from the first end 132 and are oriented to extend upward and outward from the second end 134. The saddle 308 is then supported in on the saddle supporting assembly 106 in a downward orientation (See FIG. 3B) so that the bottom side of the saddle 308 can be cleaned from above and stored.

The saddle supporting assembly 106 and connecting rod 114 can then be rotated 180 degrees (151) around the axis 116. Referring to FIG. 3A, upon rotation 151 the saddle supporting assembly 106 is supported by the saddle engaging portions 122 and 124 in a second orientation with the axis 116 and connecting rod 114 extending horizontally and slightly elevated at the adjoining end 120 with respect to connecting end 118. When the saddle supporting assembly 106 is rotated to the second orientation, the supporting wings 122-124 are oriented to extend downward and outward from the first end 132 and are oriented to extend downward and outward from the second end 134. The saddle 308 can then be supported in a downward orientation so that the topside of the saddle can be cleaned from above (See FIG. 3A).

Referring to FIGS. 4A, 4B, 4C, 5A and 5B, an alternate embodiment of the saddle rack 400 is shown. Saddle rack 400 includes a mounting attachment assembly 402, and a saddle supporting assembly 404 (assembly 106 as described in connection with FIGS. 1-3). The mounting attachment assembly 402 includes a rigid loop 406 that can be secured to a vertical structure 502 (FIG. 5B), and a stabilizing cubed block 408 having outer surfaces 410 and 412 on sides that oppose each other. Saddle support assembly includes a connecting rod 414 with a first end 432 and a second end 434 (134 of FIG. 1) with axis 416 extending therethrough. One side 417 of the stabilizing block 408 between surfaces 410 and 412 is integrally attached to the saddle support assembly 404 adjacent the first end 432 (132 of FIG. 1) of connecting rod 414 (rod 114 of FIG. 1). Opposing side 419 (of side 417) of stabilizing block 408 engages with vertical structure 502

Figure 5A:
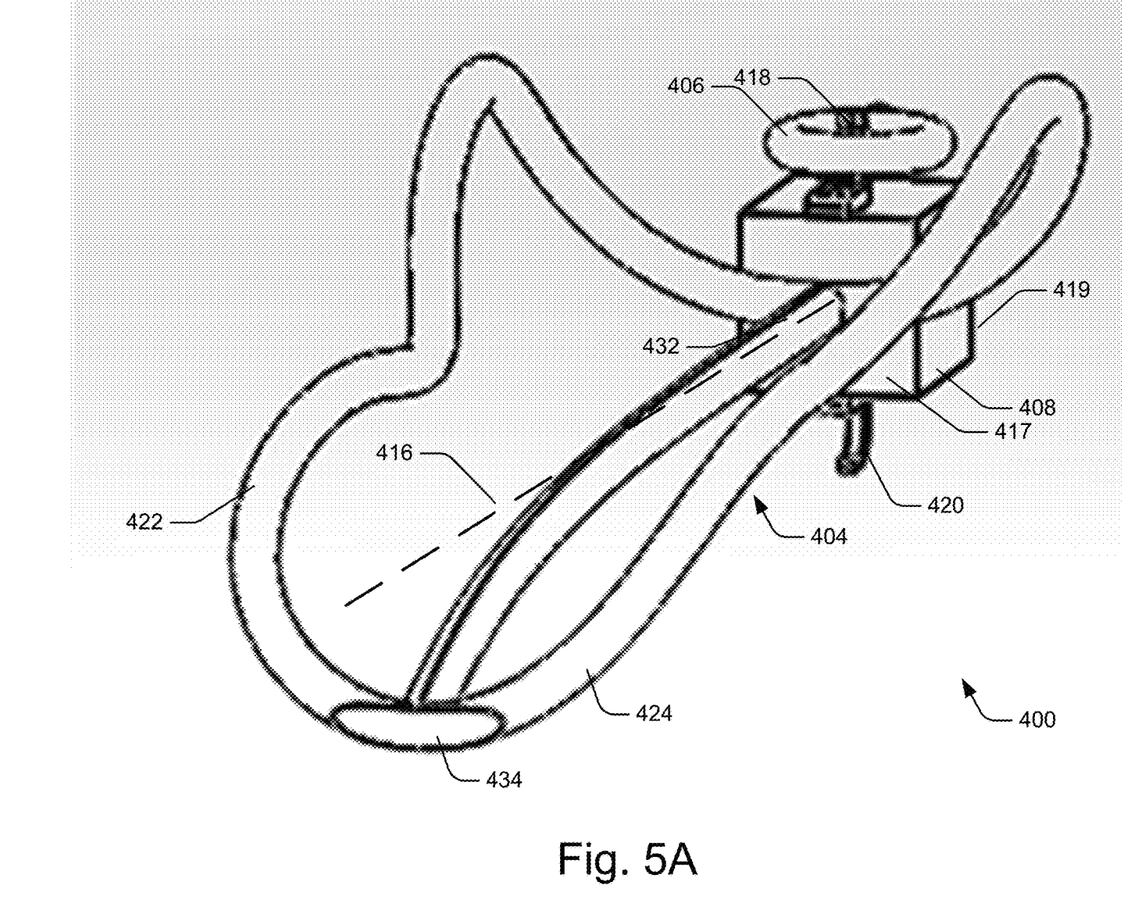
FIG. 5A shows a front-side perspective view of the alternate embodiment of the portable saddle rack in a first orientation.
Figure 5B:
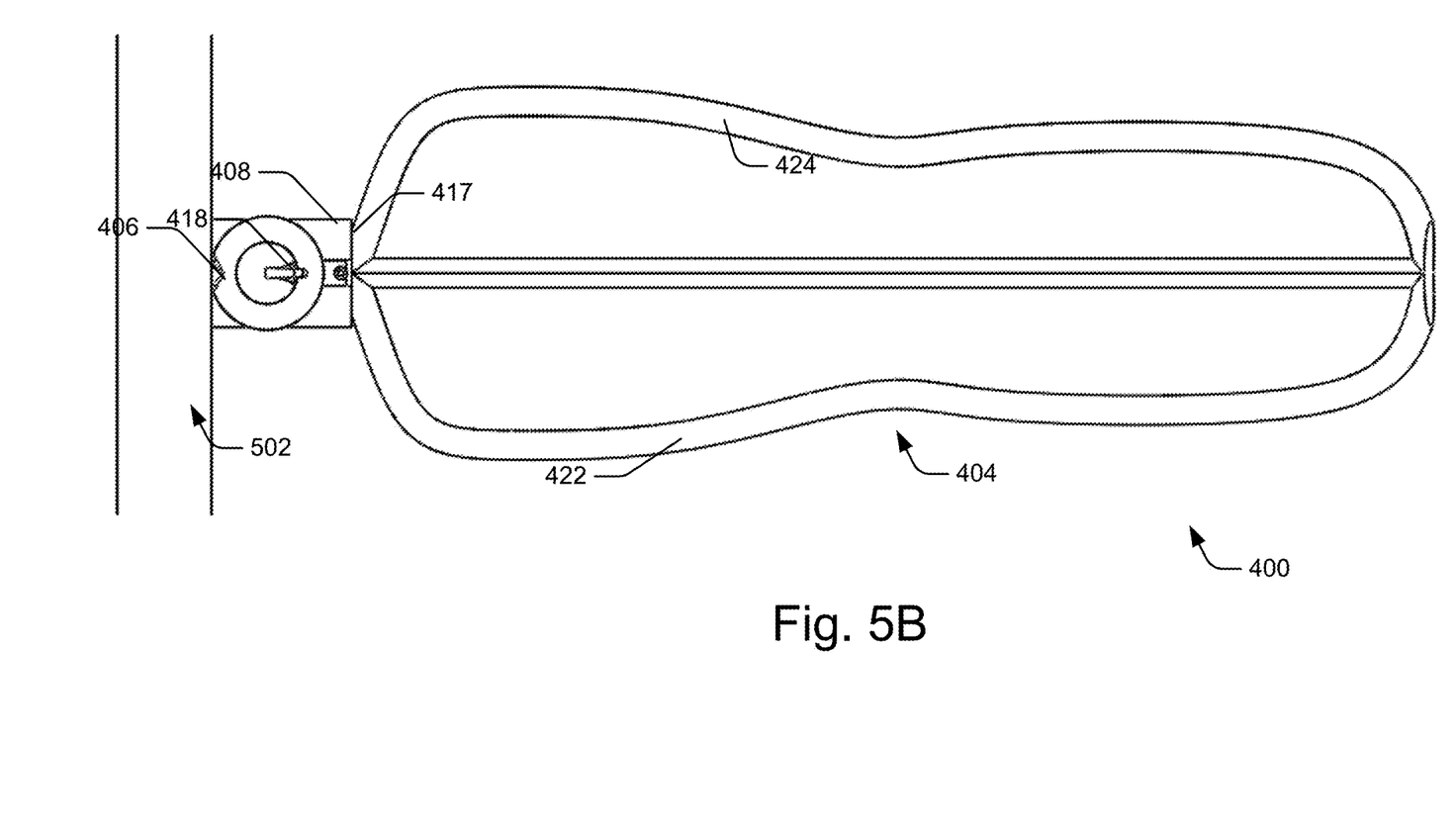
FIG. 5B shows a top perspective view of the alternate embodiment of the portable saddle rack in a second orientation connected to a loop on a vertical structure.

Referring to FIG. 5A-5B, the stabilizing block 408 has hooks 418 and 420 facing toward side 417 on the two opposing outer surfaces 410 and 412 respectively so that hook 418 engages with a rigid loop 406 secured to the vertically oriented structure 502 when the saddle supporting assembly is to be oriented to the first orientation. Simultaneously side 419 of stabilizing block 408 engages with vertical structure 502 when hook 418 engages with ridged loop 406.

Figure 4A:
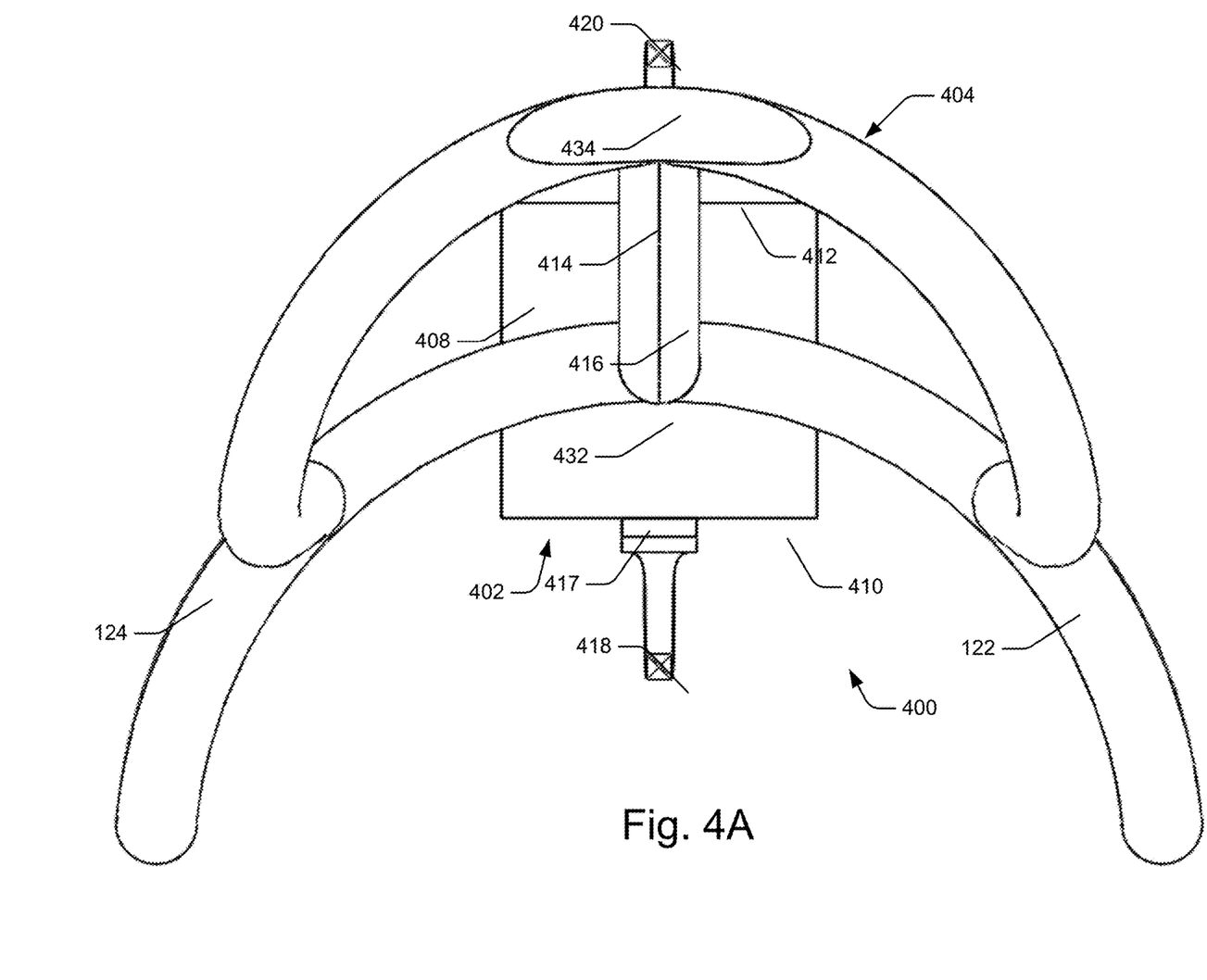
FIG. 4A shows a front perspective view of an alternate embodiment of a portable saddle rack in a first orientation.
Figure 4B:
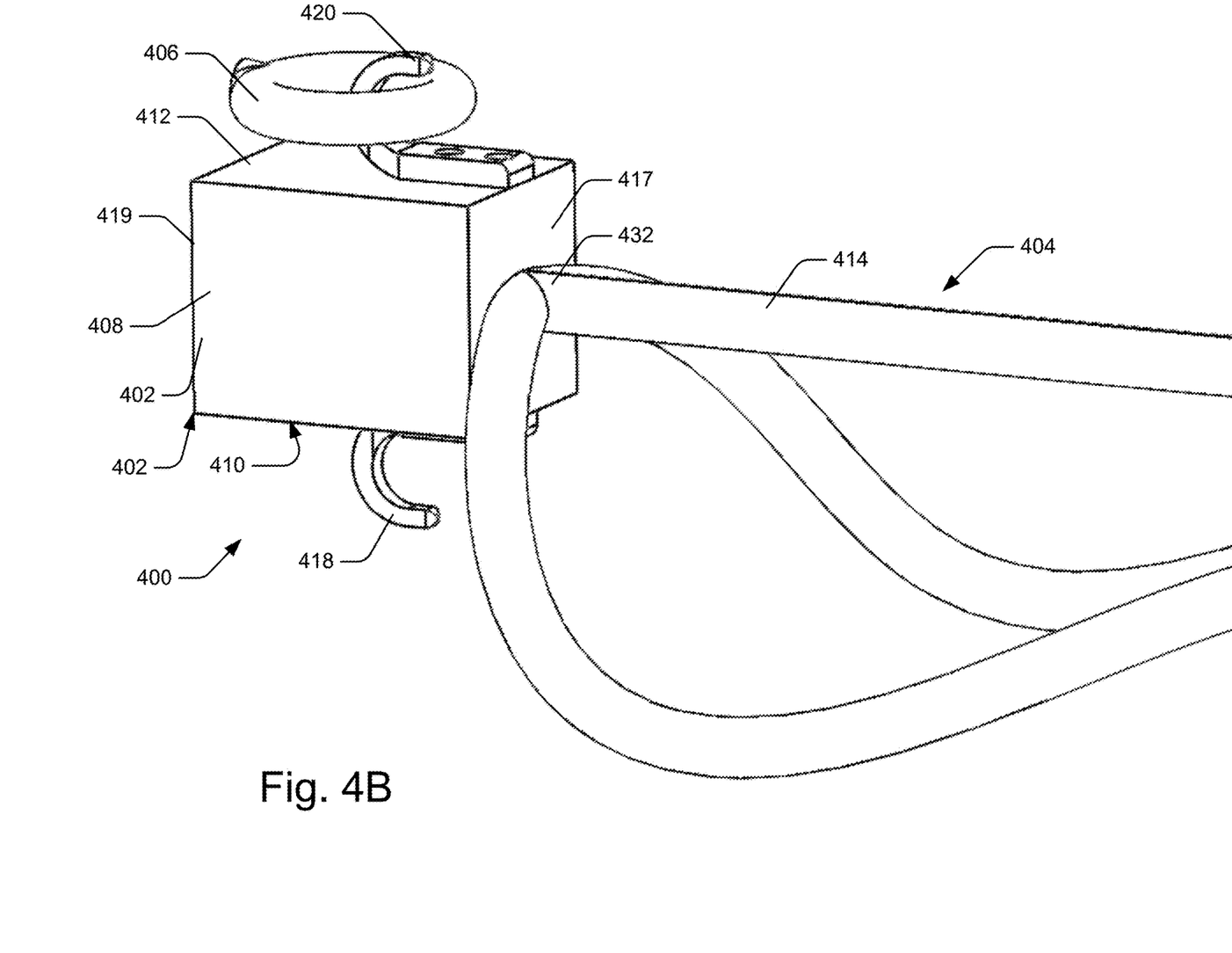
FIGS. 4B-4C shows side perspective views of the alternate embodiment of the portable saddle rack.

Referring to FIG. 4A-4B, hook 420 engages with the rigid loop 406 secured to the vertically oriented structure 502 when the saddle supporting assembly 502 is to be oriented to the second orientation. Simultaneously side 419 of stabilizing block 408 engages with vertical structure 502 when hook 420 engages with ridged loop 406.

Referring to FIGS. 5A and 5B, upon the saddle supporting assembly 404 being oriented to the first orientation, the supporting wings 422-424 (similar to wings 122-124 of FIG. 1) are oriented to extend upward and outward from the first end 432 and are oriented to extend upward and outward from the second end 434. A saddle (e.g. saddle 308 of FIG. 3B) is then supported in on the saddle supporting assembly 404 in a downward orientation (such as shown in FIG. 3B) so that the bottom side of the saddle can be cleaned from above and stored.

Figure 4C:
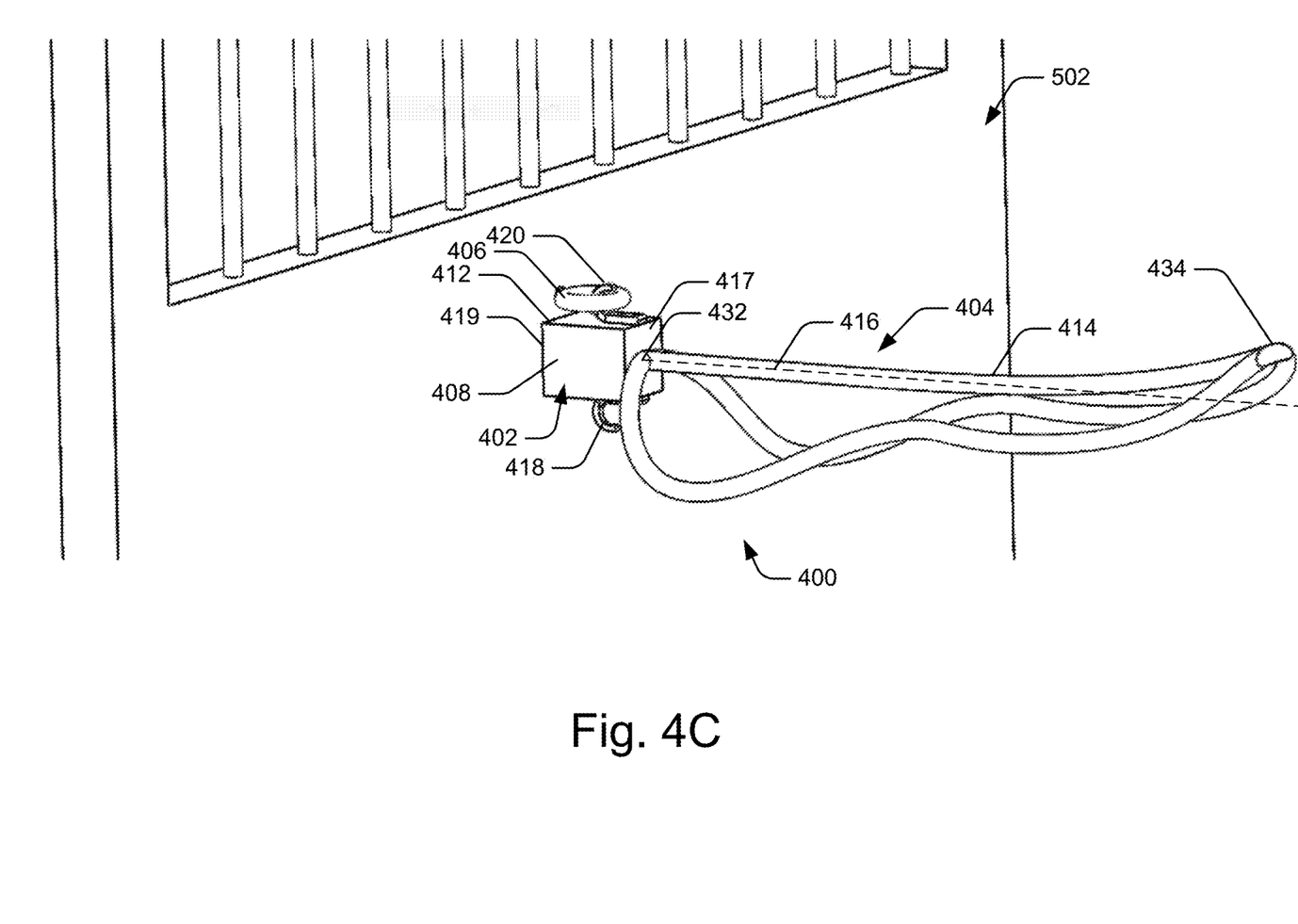

Referring to FIG. 5A, when in the first orientation, the saddle supporting assembly 404 and hook 418 can be removed from loop 406 and can then be rotated 180 degrees around the axis 416. Referring to FIGS. 4A-4C, upon rotation the saddle supporting assembly 404 is supported by the hook 420 engaging with ridged loop 406 so that the saddle supporting assembly 404 is rotated to the second orientation with the axis 416 and connecting rod 414 extending horizontally and slightly elevated at the connecting end with respect to the adjoining end. When the saddle supporting assembly 404 is oriented to the second orientation, the supporting wings 122-124 are oriented to extend downward and outward from the first end 132 and are oriented to extend downward and outward from the second end 134 (slightly elevated at the adjoining end with respect to the connecting end). The saddle 308 (See FIG. 3A) when resting on saddle supporting assembly 404 can then be supported with block 408 in a downward orientation so that the top of the saddle 308 can be cleaned from above (As shown in FIG. 3A).

Figure 6:
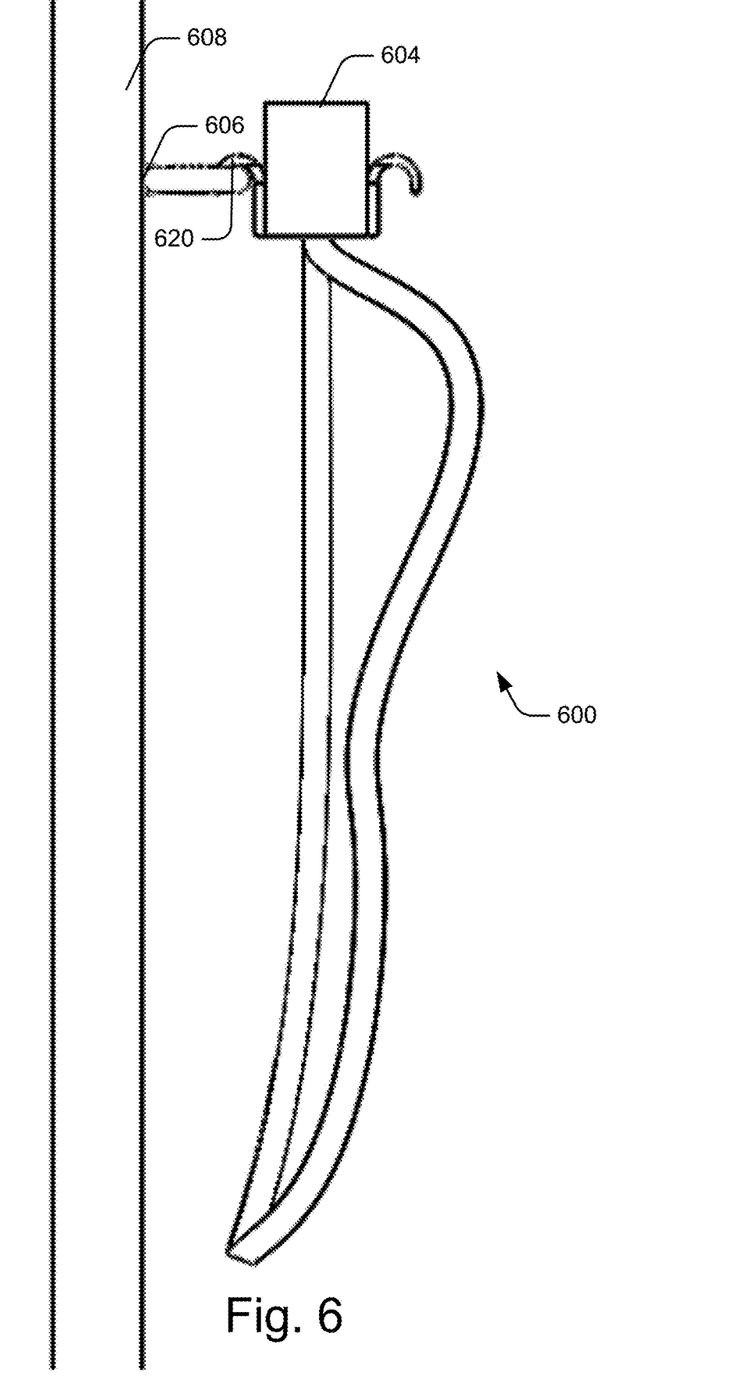
FIG. 6 shows a side perspective view of a stationary orientation of the alternate embodiment of the saddle rack connected to the loop on the vertical structure for saving space when not in use.

Referring to FIG. 6, saddle rack 600 (saddle rack 400 in FIG. 4) can be oriented downward with hook 620 on mounting attachment 604 attached to loop 606 on vertical wall (structure) 608. This mounting attachment assembly orientation allows for either a configuration where the rack 600 can be cleaned as well as a collapsed configuration that saves space while the rack is not in use.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the inven-

What is claimed is:

1. A saddle rack comprising:
   a mounting attachment assembly configured to engage with a vertically oriented structure; and
   a saddle supporting assembly including a plurality of supporting wings, each of the plurality of supporting wings having a first end and a second end with an axis extending from the respective first end to the respective second end, the saddle supporting assembly configured to engage with the mounting attachment assembly wherein the saddle supporting assembly is configured to be a) supported by the mounting attachment assembly with the axis extending horizontally in a first orientation, and b) rotated 180 degrees around the axis to be supported by the mounting attachment assembly with the axis extending horizontally in a second orientation, each of the plurality of supporting wings in the first orientation to extend upward and outward from the respective first end and to extend upward and outward from the respective second end, and each of the plurality of supporting wings in the second orientation to extend downward and outward from the respective first end and to extend downward and outward from the respective second end,
   wherein when each of the plurality of supporting wings are in the first orientation, the elevation of each of the second ends is below each of the first ends, and when each of the plurality of supporting wings are in the second orientation, the elevation of each of the second ends is above each of the first ends.

2. The saddle rack as recited in claim 1, wherein the mounting attachment assembly includes a saddle supporting assembly receiver that engages with the saddle supporting assembly to support the saddle supporting assembly upon being rotated 180 degrees around the axis from the first orientation to the second orientation.

3. The saddle rack of claim 2 further comprising a connecting rod extending along the axis and having a connecting end and an adjoining end, the connecting rod to engage at the connecting end with the saddle supporting assembly receiver, the connecting rod coupled with each of the first ends of the plurality of supporting wings adjacent to the connecting end, and coupled with each of the second ends of the plurality of supporting wings adjacent to the adjoining end.

4. The saddle rack of claim 3, wherein a diverging angle between the plurality of supporting wings is greater at the adjoining end of the connecting rod than at the connecting end of the connecting rod.

5. The saddle rack of claim 2, wherein the mounting attachment assembly comprises:
   a portable base mount with a hooking first end to enable the mounting attachment assembly to hang on the vertically oriented structure, and a stabilizing second end to prevent unhooking of the portable base mount from the vertically oriented structure.

6. The saddle rack of claim 3, wherein the connecting rod forms an aperture adjacent to the connecting end through which a securing pin is configured to be inserted, wherein the supporting assembly receiver forming a first aperture to receive the connecting rod and a second aperture to receive a securing pin when the first aperture receives the connecting rod.

7. The saddle rack of claim 3 wherein each of the plurality of supporting wings have at least two curves to form a shape of an English saddle, a first curve of the at least two curves is adjacent to the connecting end and a second curve of the at least two curves is adjacent to the adjoining end, and further wherein when the saddle supporting assembly is in the first orientation, the first curve extends more upwards and outwards as compared to the second curve and when the saddle supporting assembly is in the second orientation, the first curve extends more downwards and outwards as compared to the second curve.

8. A method for cleaning and storing a saddle comprising:
   hanging with a hooking first end of a portable base mount of a mounting attachment assembly on a vertically oriented structure;
   preventing an unhooking of the portable base mount from the vertically oriented structure with a stabilizing second end of the portable base mount;
   engaging a saddle supporting assembly receiver of the mounting attachment assembly with a connecting rod of a saddle supporting assembly;
   inserting the connecting rod into a first aperture of the saddle supporting assembly receiver;
   aligning a second aperture of the saddle supporting assembly receiver with the aperture of the connecting rod;
   inserting a securing pin into the aperture of the connecting rod upon the first aperture receiving the connecting rod and the second aperture of the saddle supporting assembly receiver aligning with the aperture of the connecting rod;
   including with the saddle supporting assembly the connecting rod connected to a plurality of supporting wings, each of the plurality of supporting wings having a first end and a second end with an axis extending from the respective second end to the respective first end through the connecting rod;
   upon the mounting attachment assembly hanging on the vertically oriented structure, engaging the saddle supporting assembly receiver with the connecting rod extending through the first aperture such that the saddle supporting assembly and the connecting rod upon insertion into first aperture is supported by the saddle supporting assembly receiver in a first orientation with the axis extending horizontally;
   rotating the saddle supporting assembly and connecting rod 180 degrees around the axis so that the saddle supporting assembly is supported by the mounting attachment assembly in a second orientation with the axis and connecting rod extending horizontally;
   upon the saddle supporting assembly oriented to the first orientation, orienting each of the plurality of supporting wings to extend upward and outward from the respective first end and to extend upward and outward from the respective second end;
   supporting a saddle in an upward orientation upon orienting the plurality of supporting wings in the first orientation so that the underside of the saddle is configured to be cleaned from above and stored;
   upon the saddle supporting assembly oriented to the second orientation, orienting the plurality of supporting wings in the second orientation to extend downward and outward from the respective first end and to extend downward and outward from the respective second end; and
   supporting the saddle in a downward orientation upon orienting the plurality of supporting wings in the second orientation so that a topside of the saddle is configured to be cleaned from above, wherein when each of the plurality of supporting wings are in the first orientation, the elevation of each of the second ends is below each of the first ends, and when each of the plurality of supporting wings are in the second orientation, the elevation of each of the second ends is above each of the first ends.

9. The method for cleaning and storing a saddle as recited in claim 8, wherein rotating the saddle supporting assembly and connecting rod 180 degrees around the axis so that the saddle supporting assembly is supported by the mounting attachment assembly in a second orientation with the axis and connecting rod extending horizontally further comprises:

rotating the saddle supporting assembly and connecting rod within the first aperture 180 degrees around the axis so that the saddle supporting assembly is supported by the mounting attachment assembly in a second orientation with the axis and connecting rod extending horizontally.

10. A saddle rack comprising:

a mounting attachment assembly, having a portable base mount with a hooking first end to enable the mounting attachment assembly to hang on a vertically oriented structure and a stabilizing second end to prevent an unhooking of the portable base mount from the vertically oriented structure, the mounting attachment assembly having a saddle supporting assembly receiver to engage with a connecting rod of a saddle supporting assembly, the connecting rod forming an aperture adjacent to a connecting end of the connecting rod through which a securing pin is configured to be inserted, and the saddle supporting assembly receiver forming a first aperture to receive the connecting rod and forming a second aperture that aligns with the aperture of the connecting rod to receive the securing pin into the aperture of the connecting rod upon the first aperture receiving the connecting rod; and the saddle supporting assembly including the connecting rod connected to a plurality of supporting wings, each of the plurality of supporting wings having a first end and a second end with an axis extending from the respective second end to the respective first end through the connecting rod, the saddle supporting assembly is configured to engage with the mounting attachment assembly wherein the connecting rod upon insertion into the first aperture a) is configured to be supported by the mounting attachment assembly in a first orientation with the axis extending horizontally, and b) configured to be rotated 180 degrees around the axis and inserted into the first aperture to be supported by the mounting attachment assembly in a second orientation with the axis extending horizontally, each of the plurality of supporting wings in the first orientation to extend upward and outward from the respective first end and to extend upward and outward from the respective second end to support a saddle in a upward orientation so that an underside of the saddle can be cleaned from above and stored, and each of the plurality of supporting wings in the second orientation to extend downward and outward from the respective first end and to extend downward and outward from the respective second end to support the saddle in an downward orientation so that a top side of the saddle can be cleaned from above.

11. The saddle rack of claim 10, wherein when each of the plurality of supporting wings are in the first orientation, the elevation of each of the second ends is below each of the first ends, and when each of the plurality of supporting wings are in the second orientation, the elevation of each of the second ends is above each of the first ends.

12. The saddle rack of claim 10 wherein the connecting rod extends along the axis and has a connecting end and an adjoining end, the connecting rod to engage at the connecting end with the saddle supporting assembly receiver, the connecting rod coupled with the first ends of the plurality of supporting wings adjacent to the connecting end, and coupled with the second ends of the plurality of supporting wings adjacent the adjoining end.

13. The saddle rack of claim 12, wherein a diverging angle between the plurality of supporting wings is greater at the adjoining end of the connecting rod than at the connecting end of the connecting rod.

14. The saddle rack of claim 12 wherein each of the plurality of supporting wings have at least two curves to form a shape of an English saddle, a first curve of the at least two curves is adjacent to the connecting end and a second curve of the at least two curves is adjacent to the adjoining end, and further wherein when the saddle supporting assembly is in the first orientation, the first curve extends more upwards and outwards as compared to the second curve and when the saddle supporting assembly is in the second orientation, the first curve extends more downwards and outwards as compared to the second curve.

\* \* \* \* \*